United States Patent [19]

Tashiro et al.

[11] Patent Number: 5,556,583
[45] Date of Patent: Sep. 17, 1996

[54] ENCAPSULATION METHOD

[75] Inventors: Nansei Tashiro, Sodegaura-machi, Japan; Osamu Maruyama, Jakarta, Indonesia

[73] Assignee: Dainippon Ink and Chemicals, Inc., Tokyo, Japan

[21] Appl. No.: 190,586

[22] Filed: Feb. 2, 1994

Related U.S. Application Data

[63] Continuation of Ser. No. 677,185, Mar. 29, 1991, abandoned.

[51] Int. Cl.⁶ ................................................. B01J 13/02
[52] U.S. Cl. ...................... 264/4.1; 106/22 C; 427/213.3; 427/213.31; 427/213.33; 427/213.34; 427/213.36; 428/402.21; 428/402.22; 428/402.24; 430/138
[58] Field of Search ............................ 264/4.1, 4.3, 4.32, 264/4.33, 4.6, 4.7; 427/213.3, 213.31, 213.33, 213.34, 213.36; 428/402.21, 402.22, 402.24; 525/936

[56] References Cited

U.S. PATENT DOCUMENTS

| | | | |
|---|---|---|---|
| 3,016,308 | 1/1962 | Macaulay | 428/402.21 X |
| 3,544,500 | 12/1970 | Osmond et al. | 427/213.34 X |
| 3,737,337 | 6/1973 | Schnoring et al. | 427/213.3 X |
| 4,162,165 | 7/1979 | Schwab | 106/21 |
| 4,228,216 | 10/1980 | Austin et al. | 264/4.7 X |
| 4,482,606 | 11/1984 | Bousquet et al. | 428/402.22 |
| 4,722,838 | 2/1988 | Tocker | 428/402.24 X |

FOREIGN PATENT DOCUMENTS

| | | |
|---|---|---|
| 0000903 | 3/1979 | European Pat. Off. . |
| 0064967 | 11/1982 | European Pat. Off. . |
| 3008658 | 9/1980 | Germany . |

*Primary Examiner*—Richard D. Lovering
*Attorney, Agent, or Firm*—Armstrong, Westerman, Hattori, McLeland & Naughton

[57] ABSTRACT

An encapsulation method applicable to pharmaceutical preparations, cosmetics, pigment imparting materials such as inks, paints, dyes, electrostatic toner, and others is disclosed, as are methods of use thereof. According to the disclosed method, the use of auxiliary materials such as emulsifiers or surfactants can be dispensed with, and ultra-microcapsules having a readily controllable diameter of 1 μm and less can be produced. The disclosed method includes the steps of preparing an organic phase consisting of a mixture of one or more hydrophobic liquid and/or solid materials and self dispersible resin which through the action of an aqueous phase, self disperses into particles with a diameter of 0.1 μm and less; combining an aqueous phase with the organic phase, whereby self emulsification takes place, thereby encapsulating the one or more hydrophobic liquid and/or solid materials.

2 Claims, 2 Drawing Sheets

ENCAPSULATION METHOD

This application is a continuation of application Ser. No. 07/677,185 filed Mar. 29, 1991, abandoned.

BACKGROUND OF THE INVENTION

1. Field of the Invention

The present invention pertains to encapsulated substances. More particularly, the present invention pertains to microcapsules, encapsulating materials and methods applicable to the preparation of microcapsules, encapsulated microgranules, encapsulated microdroplets and the like, as well as to methods of use thereof.

2. Prior Art

Conventional encapsulation methods available up to the present time can generally be classified as either physical-mechanical encapsulation methods or chemical encapsulation methods. Included among conventional chemical encapsulation methods are physicochemical methods such as coacervation, interfacial polymerization methods, in situ methods and the like.

In the case of physical•mechanical encapsulation methods, particle size control is generally achieved through control of the physical conditions under which the involved processes are carried out. With chemical encapsulation methods, particle size control can be achieved through addition of hydrophilic substances such as emulsifiers (surfactants), protective colloids, etc., and through adjusting the amount and/or type of such hydrophilic substances. In addition, particle size control with chemical encapsulation methods can be effected through adjustment of various chemical and physical conditions such as mixing speed, pH, temperature, reaction rate, etc. during one or more of the steps involved in the chemical encapsulation method.

In the case of the invention disclosed in Japanese Patent Application, First Publication Serial No. Sho-51-129485 wherein unsaturated polyester resin modified with hydrophilic polyethylene oxide is employed as a part of a wall forming component, even though an emulsifier (surfactant) and/or water soluble resin are utilized therewith, pigment containing microcapsules having a relatively large average diameter of on the order of 2 to 25 µm are produced. With the invention disclosed in Japanese Patent Application, Second Publication Serial No. Sho-58-501631, the liquid crystal microcapsules prepared according thereto using polyvinyl alcohol and/or gelatin as water soluble resin again have a comparatively large diameter, ranging from 2 to 25 µm. In the method disclosed in Japanese Patent Application, First Publication Serial No. Sho-62-254483 as well, the pigment containing microcapsules formed thereby using emulsifier (surfactant) and water soluble protective colloid resin have a diameter on the order of 5 µm.

In the method disclosed in Japanese Patent Application, First Publication Serial No. Sho-57-190647, water insoluble resin is utilized as one wall forming component, and secondary processing using surface activating agents and the like is carried out. Although encapsulation is carried out in an aqueous solution of water soluble protective colloid resin such as gelatin or gum arabic which functions as a small particle stabilizing agent, the diameter of the resulting microcapsules ranges from 2 to 25 µm.

With all of the various methods thus described, the diameter of the smallest microcapsules which can be produced is on the order of several micrometers. In particular, those produced by physical•mechanical encapsulation methods tend to have a relatively great diameter. With chemical encapsulation methods by which means comparatively smaller microcapsules can be produced, by increasing the amount of hydrophilic constituents whereby wall forming material and core forming material are dispersed, even smaller diameter microcapsules can be produced, although even so, diameters of less than 1 µm can be achieved only with great difficulty. Even with various attempts which have been made using unacceptably large amounts of auxiliary agents such as hydrophilic substances, the goal of achieving sub-micron order sized microcapsules has been unattainable as yet. As described previously, up to the present time, it has similarly not been possible to produce microcapsules having diameters of 1 µm and less using emulsifying agents, hydrophilic protective colloids, and various other types of auxiliary agents.

As a particular example of an application of microcapsules, paints, inks and similar products can be prepared using encapsulated pigments. However, in order to produce a product which provides a highly attractive, super high-gloss surface, so-called ultramicrocapsules having a diameter of 1 µm and less are required. Furthermore, from the standpoint of producing a durable, long lasting super high-gloss surface, generally minimal use of hydrophilic substances therein is desirable.

In view of the preceding discussion, it can be appreciated that encapsulation technology in its present state is inadequate when applied to super high-gloss paints. That is to say, means are not presently available for the production of sufficiently small diameter ultramicrocapsules which can be used in paints and the like so as to provide for super high-gloss finishes through the use thereof. Furthermore, with the incorporation of various hydrophilic substances which is generally employed at present as the means to produce microcapsules having a size approaching that of ultramicrocapsules, a corresponding deterioration in the durability and endurance characteristics of finished surfaces resulting from the use thereof occurs.

SUMMARY OF THE INVENTION

In consideration of the above, it is an object of the present invention to provide a microcapsule and encapsulation method therefor wherein the use of auxiliary materials such as surfactants (emulsifiers) can be dispensed with, and whereby ultramicrocapsules having a readily controllable diameter of 1 µm and less can be produced, as well as to provide a method of use for such ultramicrocapsules.

Accordingly, the present invention provides an encapsulation method for encapsulation of hydrophobic liquids as well as solid materials, applicable but not limited to the manufacture of pharmaceutical preparations, cosmetics, various pigment imparting materials such as inks, paints, dyes, as well as agents used for recording character and pictorial information such as electrostatic toner, thermal printing media and others. According to the encapsulation method of the present invention, one or more hydrophobic liquid and/or solid materials are encapsulated by a process including the steps of preparing an organic phase consisting of a mixture of one or more hydrophobic liquid and/or solid materials and self dispersible resin which through the action of an aqueous phase, self disperses into particles with a diameter of 0.1 µm and less; combining an aqueous phase with the organic phase, whereby self emulsification takes place, thereby encapsulating the one or more hydrophobic liquid and/or solid materials.

DETAILED DESCRIPTION OF THE PREFERRED EMBODIMENTS

In the following, the preferred embodiments of the present invention will be described in detail with reference to the appended drawings.

For the self dispersible resin employed in the present invention, suitable examples thereof include the various types of dispersion resins such as epoxy resins, urethane resins and acrylic resins used in the production of inks, paints, textiles, adhesives and the like. Concrete examples thereof include the urethane type resins disclosed in U.S. patent Ser. No. 4,066,591; the acrylic type resins disclosed in British Patent, Ser. No. 2,039,497; the polyester type resins disclosed in U.S. Patent Ser. Nos. 4,179,428 and 4,735,995; the epoxy type resins disclosed in Japanese Patent Application Second Publication, Ser. No. Sho-60-49645 and Japanese Patent Application Second Publication, Ser. No. Sho-62-13384; the epoxy-acrylic type resins disclosed in U.S. patent Ser. Nos. 4,212,781 and 4,480,058. Additional examples include vinyl acetate—vinyl chloride copolymer resins disclosed in U.S. patent Ser. No. 4,451,682, along with the various resins described in *Progress in Organic Coatings*, No. 9, pp 281–340 (1981) and "Non-Polluting Coatings and Coating Processes", Plenum Press, New York (1973).

Substances which may be suitably encapsulated by the method of the present invention include hydrophobic materials and substances which are water insoluble or are poorly water soluble.

Figure 1:
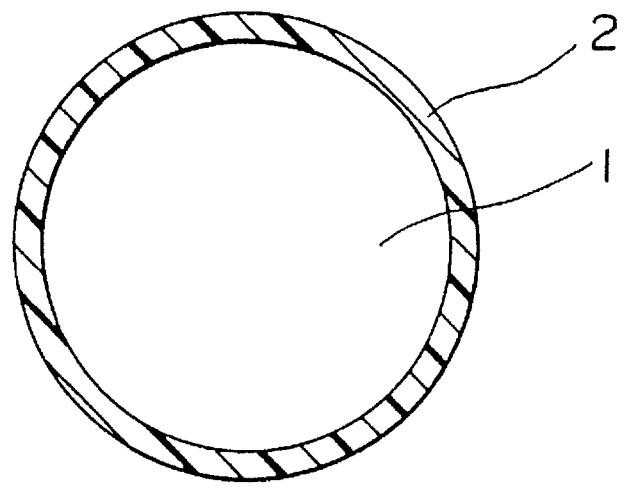
FIG. 1 is a cross-sectional diagram illustrating a microcapsule in accordance with the present invention.

In the encapsulation method of the present invention, a first manufacturing process is carried out wherein the hydrophobic substance to be encapsulated 1 as shown in FIG. 1 is dispersed or dissolved in an organic solution of the above mentioned self dispersible resin, to thereby form an organic phase. A second manufacturing process is then carried out wherein the above mentioned organic phase is dispersed in an aqueous phase, during which process the self dispersible resin forms a wall 2 around the hydrophobic material to be encapsulated 1. A third manufacturing process is then carried out wherein the solvent in the above mentioned organic phase is distilled and thereby removed. When a powdered form for the microcapsules is desirable, an optional fourth manufacturing process is then carried out wherein through spray drying, water is removed to thereby form a dry powder made up of the microcapsules thus manufactured.

In the first manufacturing process in which the hydrophobic substance to be encapsulated 1 is dispersed or dissolved in an organic solution of the above mentioned self dispersible resin, the hydrophobic substance employed may be either a solid or liquid material. When solid material having large particle size is employed, the material may be first pulverized and dispersed in an organic phase using a roll mill, sand mill, and the like.

With many commercially available pigments which can be employed as the hydrophobic material to be encapsulated 1, the manufacturer first obtains the pigment material in the form of a wet cake which is then dried and powdered. Such commercially available pigments, however, have a relatively large particle size on the order of several μm and more, for which reason subsequent pulverizing becomes necessary. If, however, the pigment material is obtained while still in the wet cake state wherein cohesive forces between individual pigment particles have not yet developed, subsequent pulverization and the required equipment may not be necessary, in which case the pigment material can be used directly.

When pigment material is obtained in the wet cake state, attention must be paid to the water content thereof. When water is excessive, dispersion of the self dispersible resin itself may start prior to dispersing the pigment in the organic phase into the aqueous phase. In such a case, the yield of unencapsulated material in the final product may be unacceptably high.

However, even pigment material having a high water content can be used in the method of the present invention by employing the so-called flash method. According to the flash method, for example, resin having carboxyl groups is combined with the wet cake form pigment material, after which excess water is driven off therefrom, and then carboxyl groups of the resin are neutralized with a basic compound such as triethyl amine, through the process of which, self dispersibility of the resin is achieved. When the flash method is employed in the method of the present invention, it is desirable that all of the excess water be driven off and hence removed prior to completion of the neutralization process.

The self dispersible resin employed in the present invention should have a molecular weight on the order of 3,000 to 100,000, and more preferably, on the order of 5,000 to 30,000. Prior to use, this self dispersible resin is dissolved in an organic solvent, and should be used in an amount appropriate to form a capsule layer 2 on each particle of the material to be encapsulated.

The organic solvent used is not particularly limited, provided it is capable of dissolving the self dispersible resin employed. However, in consideration of the above described third manufacturing process in which the organic solvent is distilled and thereby removed, solvents having a suitably low boiling point are preferred. Examples of acceptable solvents include ketone solvents such as acetone and methyl ethyl ketone, ester solvents such as ethyl acetate, as well as aromatic hydrocarbons such as benzene.

In order to facilitate the above described second manufacturing process in which organic phase containing the self dispersible resin is dispersed in an aqueous phase, the viscosity of the organic phase should be adjusted so as to be in the range of less than 20 poise by appropriately controlling the concentration of self dispersible resin and materials to be encapsulated in the organic solvent.

In the second manufacturing process of the present invention wherein self dispersion of the self dispersible resin takes place thereby forming a capsule 2 around the material to be encapsulated 1, two distinctive points make the manufacture of suitably small diameter microcapsules possible. The first of these points relates to that fact that the material to be encapsulated 1 is contained in the organic phase along with the self dispersible resin. Over the course of the second manufacturing process, the originally continuous organic phase is rendered discontinuous as the organic solvent and solutes contained therein become dispersed throughout the aqueous phase. If the material to be encapsulated was to be dispersed in the aqueous phase prior to combining with the self dispersible resin containing organic phase, the final result would be a mixture of microcapsules of a great particle size together with unencapsulated particles.

The second point concerns the fact that during the second manufacturing process, the speed of stirring must be sufficiently high and the rate of mixing carefully controlled as the two phases are combined. Although relatively small diameter capsules can be obtained by high speed stirring alone, by stirring either the organic phase or the aqueous phase at a high rate while slowly adding the other phase thereto, the submicron sized ultramicrocapsules of the present invention are obtained.

If the above described flash method is carried out and the basic compound utilized therein is water soluble, or if a water soluble cross-linking agent such as a polyamine is used to assist gelation of the microcapsule walls, either of these compounds can be contained in the aqueous phase at a suitable concentration.

For the self dispersible resin, polymers having a sufficiently high glass transition point should be used so as to prevent individual powder microcapsules from sticking to one another. Suitable examples include vinyl resins and acrylate resins having a glass transition point of 50° C. or greater.

Figure 2:
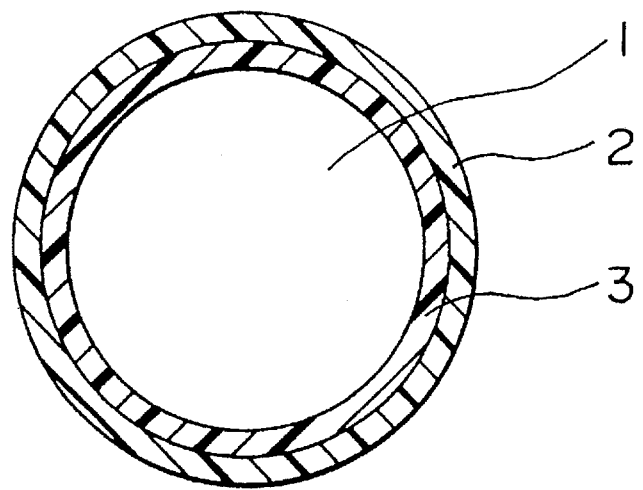
FIG. 2 is a cross-sectional diagram illustrating a second microcapsule in accordance with the present invention.

In order to provide improved endurance, resistance to solvents and the like, a gelated encapsulating layer 2 as shown in FIG. 2 can be added. This can be accomplished by using a self dispersible resin having so-called pendant type reactive groups, for example, glycidyl groups, isocyanide groups, hydroxyl groups, groups with an β, β unsaturated double bond, whereby during formation of the capsule 2 or during a later step, these pendant type reactive groups can be used to form cross-links, thereby leading to gelation. Improved endurance and resistance to solvents etc. can also be imparted by using microcapsules prepared by the method of the present invention as seeds, in which monomeric units having one or more α, β unsaturated double bond are then caused to polymerize with the formed microcapsule wall 2, forming a secondary capsule 3 therein.

Examples of suitable compounds for the self dispersible resin employed in the present invention include vinyl resins, ester resins, urethane resins, epoxy resins, as well as the various resins, for example, cellulose derivatives used in manufacture.

In order to manufacture the exceedingly small diameter microcapsules of the present invention, it is necessary that the self dispersible resin used to form the capsule walls 2 has sufficiently high self dispersible characteristics. Accordingly, the resin composition used therefor must be appropriately selected. Factors affecting self dispersible characteristics include the number and type of hydrophilic groups on the self dispersible resin, as well as location of hydrophilic groups, conformation and other structural characteristics which affect the relative exposure of such hydrophilic groups. Types of hydrophilic groups which impart improved self dispersible characteristics to the resins used include hydroxyl groups, oxazolin groups, cyclocarbonate groups, ether bonds, phosphoric ester groups, carboxyl groups, sulfuric ester groups, amino groups and neutral salts thereof.

Figure 3:
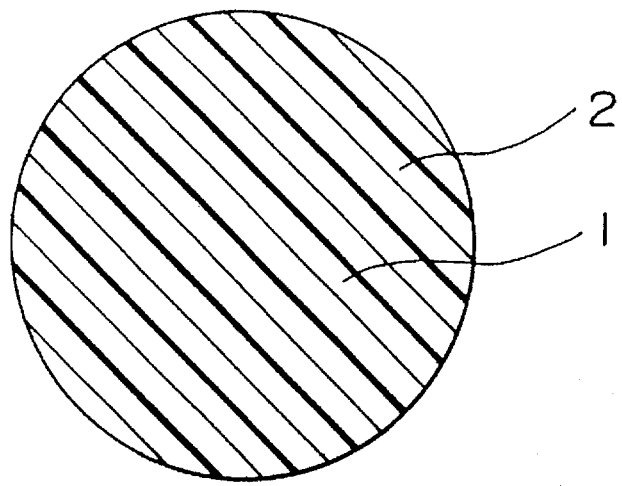
FIG. 3 is a cross-sectional diagram illustrating a third microcapsule in accordance with the present invention.

As shown in FIG. 3, when capsules are manufactured according to the method of the present invention and the mutual miscibility of the material to be encapsulated 1 and the self dispersible resin which forms the capsule wall 2 is high, there is a tendency for the boundary between the material to be encapsulated 1 and the capsule wall 2 to become less well defined. Thus, as can be appreciated from FIG. 3, rather than a clear boundary, a continuum forms, such that the outer surface of the capsule is largely formed by the self disperible resin, and the central part of the capsule is largely formed by the hydrophobic material to be encapsulated, and moving from the outer surface to the center of the capsule, a more or less continuous transition between the two is made.

Figure 4:
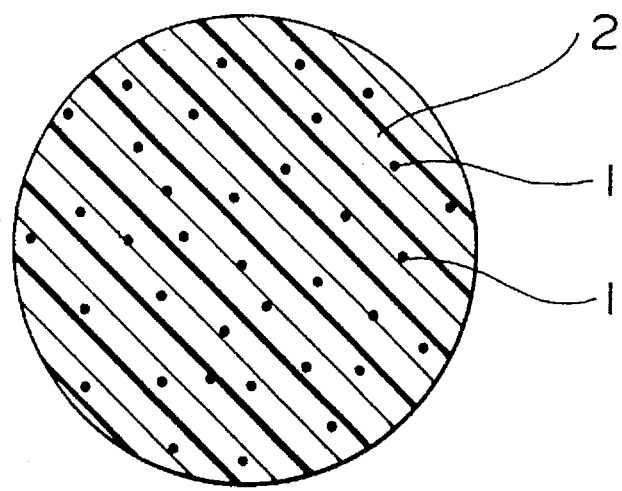
FIG. 4 is a cross-sectional diagram illustrating a fourth microcapsule in accordance with the present invention.

As shown in FIG. 4, when capsules are manufactured according to the method of the present invention and the diameter of individual particles or droplets of the material to be encapsulated 1 is extremely small compared with the finished capsules, multiple occurrences of the material to be encapsulated 1 are dispersed throughout the self dispersible resin which forms the capsule wall 2.

Reference Example 1

In a flask, 293 parts of polytetramethylene glycol (Unisafe PT-200, Nippon Oil & Fats Company, Ltd.; molecular weight≅2,000) and 77 parts of isophorone diisocyanate were heated to 120° C. under a nitrogen atmosphere while stirring, and maintained at that temperature for 30 min., followed by addition of 0.05 parts of tin 2-ethylhexanoate. After one hour, the reaction mixture was cooled to 80° C., after which 210 parts of methyl ethyl ketone and 20 parts of dimethylolpropionic acid were added. The resulting reaction mixture was maintained at 75° C. for 30 min., after which interval no increase in viscosity or decrease in the proportion of isocyanate groups was observed. The acid value of the resulting reaction mixture was measured and the proportion of isocyanate groups was determined, the results of which were 13 and 0.9%, respectively.

As a result of the above steps, polyurethane resin with terminal isocyanate groups was obtained. Nonvolatile components made up 65% of the reaction mixture and the Gardner—Hordt viscosity (hereafter abbreviated as viscosity) was W at 25° C. The resin obtained in this Reference Example 1 will hereafter be referred to as A-1.

Reference Example 2

In a flask, 416 parts of neopentyl glycol and 268 parts of dimethyl sulfoisophthalate—sodium salt were heated to 210° C. under a nitrogen atmosphere while stirring and allowed to react at that temperature over an 8 hour interval with removal of methanol, whereby a modified diol intermediate was obtained.

In a separate flask, 35 parts of toluene diisocyanate and 250 parts of methyl ethyl ketone were heated to 65° C. under a nitrogen atmosphere while stirring and maintained at that temperature. While taking care against generated heat, 200 parts of Unisafe PT-200 was gradually added. Thirty minutes following complete addition of the Unisafe PT-200, 0.02 parts of tin 2-ethylhexanoate was added and 1 hour thereafter, 10.8 parts of the modified diol intermediate obtained as described above was added. The resulting reaction mixture was maintained at 70° C. for 4 hours, after which the proportion of isocyanate groups was determined, the result of which was 0.8%.

As a result of the above steps, a solution of polyurethane resin with terminal isocyanate groups was obtained. Nonvolatile components made up 50% of the reaction mixture and the viscosity was P. The resin obtained in this Reference Example 2 will hereafter be referred to as A-2.

Reference Example 3

A solution was prepared by mixing 200 parts of styrene, 176 parts of methyl methacrylate, 24 parts of methacrylic acid and 8 parts of t-butylperoxy octanoate (Perbutyl O, Nippon Oil & Fats Company, Ltd.). In a flask, 60 parts of the resulting solution and 400 parts of methyl ethyl ketone were heated to 75° C. under a nitrogen atmosphere while stirring, and maintained at that temperature for 30 min., followed by dropwise addition of the remainder of the above prepared solution over 1.5 hours, after which the resulting reaction mixture was allowed to react over 12 hours and the same temperature. The final reaction mixture had an acid value of 20.

As a result of the above steps, a vinyl resin was obtained. Nonvolatile components made up 50% of the reaction mixture and the viscosity (hereafter abbreviated as viscosity) was W. The resin obtained in this Reference Example 3 will hereafter be referred to as A-3.

EXAMPLE 1

A mixture of 100 g of resin A-1 prepared above, 14.1 g of cyanine blue cake (Fastogen Blue TGR-Wet, Dai Nippon Ink, Inc.; 60% nonvolatile components) and 20 g of methyl ethyl ketone was vigorously stirred using a stirring rod, whereby an organic phase containing uniformly dispersed cyanine blue was obtained.

Separately, 2.3 g of triethyl amine was dissolved in 200 g of distilled water and the resulting aqueous phase was stirred using a mechanical stirrer fitted with a stirring blade while the above prepared organic phase was gradually added thereto. The resulting suspension was then heated to 70° C. and the methyl ethyl ketone was removed by reduced pressure distillation. In this way, a stable aqueous dispersion of microcapsules was obtained.

Upon optical microscopic examination at 600×magnification, spherical microcapsules were observed. Using a Coulter device (Model N-4, Coulter Corporation, US), an average particle diameter of 0.9 µm was measured.

EXAMPLE 2

Microcapsules were prepared by a method identical to that of Example 1 above, except that 0.64 g of ethylene diamine was added to the aqueous solution of triethyl amine. As a result, a stable aqueous dispersion of microcapsules was obtained consisting of spherical microcapsules with an average diameter of 0.7 µm.

In this example, the ethylene diamine reacted with the terminal isocyanate groups on the polyurethane resin in a chain elongation reaction, thereby causing molecular weight to increase furthermore.

EXAMPLE 3

Microcapsules were prepared by a method identical to that of Example 1 above, except that 0.44 g of ethylene diamine and 0.21 g of diethylene triamine were added to the aqueous solution of triethyl amine. As a result, a stable aqueous dispersion of microcapsules was obtained consisting of spherical microcapsules with an average diameter of 0.8 µm.

In this example, the ethylene diamine reacted with the terminal isocyanate groups on the polyurethane resin in a chain elongation reaction and the diethylene triamine lead to the formation of a cross-linked gel, thereby causing molecular weight increase and improved properties.

EXAMPLE 4

Microcapsules were prepared by a method identical to that of Example 3 above, except that 48.5 g Fastogen Blue TGR-Wet and 50 g of methyl ethyl ketone were used instead of 14.1 g TGR-Wet and 20 g methyllethyl ketone. As a result, a stable aqueous dispersion of microcapsules was obtained consisting of spherical microcapsules with an average diameter of 0.9 µm.

EXAMPLE 5

A mixture of 100 g of resin A-2 prepared above, 7.5 g of carbon black (MA-100, Mitsubishi. Carbon, Inc.) and 30 g of methyl ethyl ketone was placed in a tightly sealable container together with 200 g of 2 mm diameter steel balls and the resulting mixture was agitated for 30 min. using a paint conditioner. In this way, an organic phase containing uniformly dispersed pulverized carbon black was obtained.

Separately, 0.39 g of ethylene diamine and 0.19 g of diethylene triamine were dissolved in 200 g of distilled water and the resulting aqueous phase was stirred while the above prepared organic phase was added thereto in an identical manner to that of Example 1 above. As a result, a stable aqueous dispersion of microcapsules was obtained consisting of spherical microcapsules with an average diameter of 0.7 µm.

EXAMPLE 6

A mixture of 100 g of resin A-3 prepared above, 7.5 g of MA-100, 3.5 g triethyl amine and 30 g of methyl ethyl ketone was placed in a tightly sealable container together with 200 g of 2 mm diameter steel balls and the resulting mixture was agitated for 30 min. using a paint conditioner. In this way, an organic phase containing uniformly dispersed pulverized carbon black was obtained.

As 200 g of distilled water was stirred using a mechanical stirrer fitted with a stirring blade, the above prepared organic phase was gradually added thereto. The resulting suspension was then heated to 70° C. and the methyl ethyl ketone was removed by reduced pressure distillation. As a result, a stable aqueous dispersion of microcapsules was obtained consisting of spherical microcapsules with an average diameter of 0.7 µm.

EXAMPLE 7

Microcapsules were prepared by a method identical to that of Example 6 above, except that the MA-100 was replaced with 50 g of titanium oxide (Tipaque R-820, Ishihara Sangyo Kaisha, Ltd.) and the amount of of methyl ethyl ketone used was 50 g. As a result, a stable aqueous dispersion of microcapsules was obtained consisting of spherical microcapsules with an average diameter of 0.8 µm.

EXAMPLE 8

Microcapsules were prepared by a method identical to that of Example 7 above, except that the Tipaque R-820 was replaced an identical amount of iron oxide pigment (130 D, Toda Kogyo Corp.). As a result, a stable aqueous dispersion of microcapsules was obtained consisting of spherical microcapsules with an average diameter of 0.6 µm.

Using a spray dryer, the above obtained aqueous dispersion was dried to form a powder.

EXAMPLE 9

In a four necked flask fitted with a condenser, stirring device and nitrogen inlet, 200 parts of the aqueous dispersion of microcapsules obtained in Example 3 above having 28% nonvolatile components and 50 parts of distilled water were heated to 75° C. while stirring. Maintaining that temperature and under a nitrogen atmosphere, a mixture of 10 parts of methyl methacrylate, 8 parts of butyl methacrylate and 2 parts of aryl methacrylate, together with 10 parts of a solution of 0.02 parts ammonium persulfate in water were added dropwise over 2 hours. After completion of the above additions, the reaction was allowed to continue for 4 hours at a temperature ranging between 75° to 80° C. As a result, a dispersion of microcapsules containing 27% nonvolatile components was obtained. Microcapsules therein with an average diameter of 0.9 μm.

EXAMPLE 10

Microcapsules were prepared by a method identical to that of Example 6 above, except that the MA-100 was replaced with 25 g of ultraviolet hardening resin (Unidic V-5502, Dai Nippon Ink Chemical Industries Corp.; nonvolatile components 100%). As a result, a stable aqueous dispersion of microcapsules was obtained consisting of spherical microcapsules with an average diameter of 0.7 μm.

The result of evaluation of the glossiness of surfaces prepared with the microcapsules produced in Examples 1 through 9 above is shown in Table 1 below, together with the average particle diameter and the resistance of dried surfaces prepared therefrom to methyl ethyl ketone.

TABLE 1

| Example | 1 | 2 | 3 | 4 | 5 | 6 | 7 | 8 | 9 |
|---|---|---|---|---|---|---|---|---|---|
| Average Diameter | 0.7 | 0.7 | 0.8 | 0.9 | 0.7 | 0.7 | 0.8 | 0.6 | 0.9 |
| Gloss | Ex | Ex | Ex | Ex | Ex | G | G | G | Ex |
| Drying Conditions | RT | RT | RT | RT | RT | 60° | 60° | 60° | 60° |
| Resistance to Methyl Ethyl Ketone | P | P | G | G | G | P | P | P | G |

RT - room temperature; temperatures given in centigrade
Ex - Excellent
G - Good
P - Poor As is apparent from Table 1, ultramicroCapsules with a diameter of 1 μm and less can readily be prepared by the method of the present invention.

What is claimed is:

1. An encapsulation method wherein one or more hydrophobic liquid and/or solid materials are encapsulated by a process including the steps of:
   a) preparing an organic phase consisting of a mixture of:
      i) self-dispersible resin, selected from the group consisting of vinyl resins and urethane resins, which through the action of an aqueous phase, is self-dispersible into particles with a diameter of up to about 0.1 μm; and
      ii) said one or more hydrophobic liquid and/or solid materials; and
   b) combining an aqueous phase with said organic phase, whereby said one or more hydrophobic liquid and/or solid materials become encapsulated by said self-dispersible resin.

2. An encapsulation method wherein one or more hydrophobic liquid and/or solid materials are encapsulated by a process including the steps of:
   a) preparing an organic phase consisting of a mixture of:
      i) self-dispersible resin, selected from the group consisting of vinyl resins and urethane resins, which through the action of an aqueous phase, is self-dispersible into particles with a diameter up to about 0.1 μm; and
      ii) said one or more hydrophobic liquid and/or solid materials; and
   b) combining an aqueous phase with said organic phase, whereby self-emulsification takes place, thereby encapsulating said one or more hydrophobic liquid and/or solid materials.

* * * * *